(12) United States Patent
Yanovsky

(10) Patent No.: US 6,175,638 B1
(45) Date of Patent: Jan. 16, 2001

(54) SHADOW IMAGE ACQUISITION DEVICE

(76) Inventor: Vladislav Yanovsky, 98 St. Paul St. #4, Brookline, MA (US) 02146

( * ) Notice: Under 35 U.S.C. 154(b), the term of this patent shall be extended for 0 days.

(21) Appl. No.: 08/758,481

(22) Filed: Nov. 29, 1996

(51) Int. Cl.[7] ................................................ G06K 9/00
(52) U.S. Cl. ............................... 382/100; 76/110; 409/81
(58) Field of Search ..................... 382/209, 154, 382/142, 100, 218; 356/383, 376; 348/138, 86, 61; 76/110; 409/81–84, 131–132, 85, 93; 340/680

(56) References Cited

U.S. PATENT DOCUMENTS

| | | | |
|---|---|---|---|
| 3,599,147 | * | 8/1971 | Roders ............................... 340/146.3 |
| 3,707,999 | * | 1/1973 | Coats ..................................... 83/438 |
| 3,955,179 | * | 5/1976 | Planke ........................... 340/146.3 B |
| 4,166,949 | * | 9/1979 | Pöld et al. ........................ 250/223 B |
| 4,171,161 | * | 10/1979 | Jung ..................................... 356/383 |
| 4,172,632 | * | 10/1979 | Holmes, Jr. ........................... 350/132 |
| 4,625,107 | * | 11/1986 | Planke .............................. 250/223 B |
| 4,899,391 | | 2/1990 | Cimino et al. .......................... 76/110 |
| 5,127,532 | | 7/1992 | Cimino et al. .......................... 76/110 |
| 5,311,286 | * | 5/1994 | Pike ..................................... 356/371 |
| 5,807,042 | * | 9/1998 | Almblad et al. ........................ 409/83 |
| 5,908,273 | * | 6/1999 | Titus et al. ............................. 409/81 |

* cited by examiner

*Primary Examiner*—Leo H. Boudreau
*Assistant Examiner*—Bhavesh Mehta

(57) ABSTRACT

Shadow image acquisition device for the purpose of further digital key identification. Proposed device acquires a shadow image of a cross-section of a key by sending light rays along the groves and indentations of the key shank towards the screen. Captured cross-sectional images will be picked up by a digital scanner and stored in the computer memory for further identification, comparison and database storage. The computer uses specially designed Shadow Image Recognition software to match the captured shadow images to the stored images. When a match is made the operator is notified by means of visual output.

15 Claims, 3 Drawing Sheets

(SECTIONAL CUT ALONG LINE AA FROM FIG.3)

(SECTIONAL CUT ALONG LINE CC FROM FIG. 4)

(SECTIONAL CUT ALONG LINE AA WITH KEY INSERTED)

(SHADOW IMAGE ON SCREEN)

SHADOW IMAGE ACQUISITION DEVICE

This invention relates to the field of computer data entry devices, specifically with the purpose of further automatic key identification.

It is common knowledge that key manufacturers code and identify their keys by series of grooves and indentations on lateral surfaces of the key shank. This system of key coding allows for a great number of different key combinations thus, increasing security and reducing chances for identical key combinations. Currently over 10,000 key styles are in use to date. At this time, locksmiths rely on the manual/visual method of key blank identification in order to duplicate the key. This process relies on knowledge, skill and experience of the individual locksmith in order for it to be precise and cost effective. However, the greatest number of errors in key duplication occurs with the incorrect selection of the key blank i.e., choosing one which has groves and indentations which do not match the grooves and indentations of the original key since the differences in the forementioned grooves and indentations are often too minute for correct manual/visual identification. A mistake in selection usually results in repeated duplication using yet another key blank, additional costs acquired due to locksmiths' time, and possibly loss of business. At this time a system for automatic key identification exists (U.S. Pat. No. 4,899,391 William J. Cimino and Robert E. Powers Jun. 24, 1989). Also t known is the key holding system as part of the automatic key identification system (U.S. Pat. No. 5,127,532 William J. Cimino and Robert S Powers Jul. 7, 1992). U.S. Pat. No. 5,127,532 stems from U.S. Pat. No. 4,899,391. U.S. Pat. No. 5,127,532 (Automatic Key Identification System) functions on the following principal. A key is inserted into a mechanical key holder device which positions the key in front of a Lensing/lighting subsystem which shines the light on to the front tip of the key and picks up the resulting visible image- This image is further stored and compared to other images.

Although this particular system is capable of key identification, a variety of inherent flaws make the system inaccurate unreliable and not cost effective. Disadvantages of the system are as follows;

A. Quoted from U.S. Pat. No. 5,127,532 page 4 paragraph 2 "the main source of error is from extraneous glare and side glints from the key." Glare and side glints result from frontal light projection on to the various facets of the front tip of the key In order to reduce extraneous glare and side glints from the key the inventor positioned a number of non-reflective shields. However, these shields have not significantly reduced the problem.

B. The key holder is designed to accommodate a wide variety of keys and therefore it is not possible to provide a constant precise placement of the key relative to the Lensing/Lighting subsystem. Therefore every time a key is inserted, minute differences in lateral angulation of the key relative to the Lensing/lighting subsystem yield a different image making it difficult or impossible to interpret. Therefor, images taken of the frontal tip are an inaccurate representation of the grooves and indentations of the original.

C. Wear and tear on the front tip of the original key changes the shape of the original. Since this system identifies the key blank based on the visual examination of the front tip incorrect data can be acquired. Quality of the attained image also depends on the key's reflective ability. As an example chrome finish will produce more glare and side glints then a brass finish key of the same design, giving a chrome key larger appearance. To accommodate for this a complex lighting control system had to be implemented increasing cost.

D. Complex mechanical design of the bolder itself raise the price of the unit and increase the chances for mechanical failure. The above mentioned disadvantages are responsible for a low 80% identification rate which is unacceptable by industries standards.

SUMMARY OF THE INVENTION

It is the object of this invention to improve acquisition of the image of the keys' cross-section i.e., the image of the grooves and indentations of the lateral surfaces of the key shank for the purpose of automatic identification of keys. This object can be accomplished by sending light rays along the grooves and indentations from a rear portion of the key shank to the front tip of the key shank. This will project a precise shadow image at the key's cross-section onto the screen where the shadow image will be formed. The advantages of the shadow image vs. previously described image are as follows.

A. The shadow image technique does not produce glare and or side glints because light is not directed at the tip.

B. Difference In lateral angulation of the key will not affect the projection of its grooves and indentations C. Wear and tear of the front tip of the key will not be a factor since the image is attained from the rear portion of the key shank.

D. The reflective ability of the key is no longer a factor since the image is attained by sending light from the rear portion of the key shank which does not reflect the light as the tip does. There fore the shadow image of the key will be clearly defined on the retaining member. A constant light emitting source will be used for cost effectiveness.

E. Simple design of the holder with only a few moving parts will ensure reliable operation with significantly lower chances for mechanical failure at a significantly lower cost.

Other and further objects, as well as various advantages of this device, are pointed out in greater detail in the claims annexed hereto and forming a part hereof. However, for a better understanding of this device and advantages gained by its use reference should be had to the drawings, which form a further part hereof.

DETAILED DESCRIPTION OF THE DRAWINGS

Figure 1:
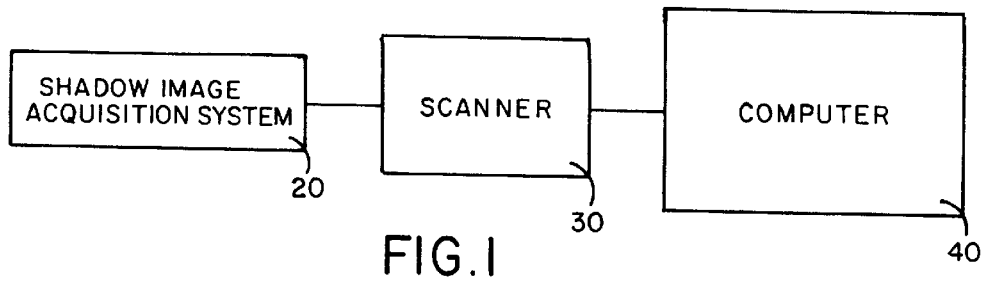
FIG. 1. Is a key identification system.
Figure 2A:
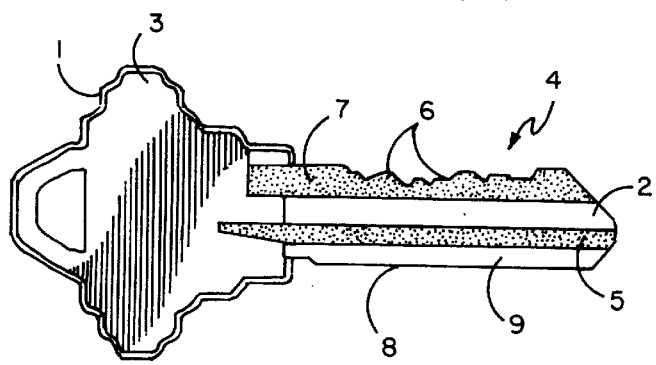
FIG. 2A is a lateral view of a notched key.
Figure 2B:
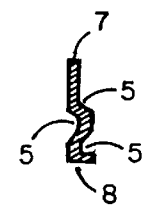
FIG. 2B is a cross sectional view of the key shank.
Figure 3:
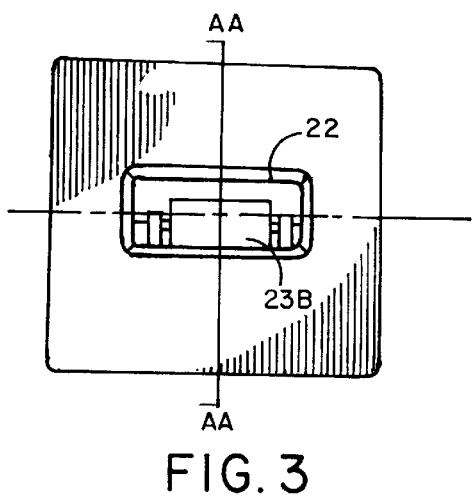
FIG. 3 Is a frontal view of the proposed device.
Figure 4:
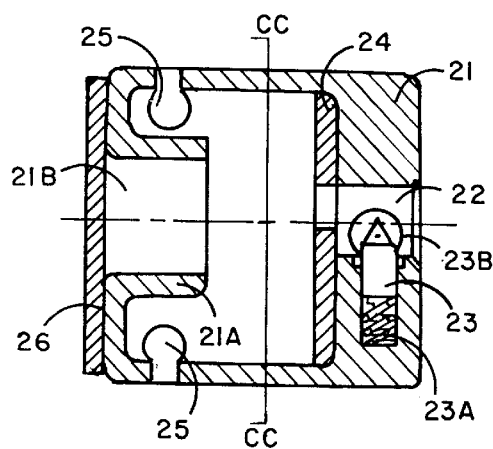
FIG. 4 Is a cross-sectional view along line AA—AA of FIG. 3.
Figure 5:
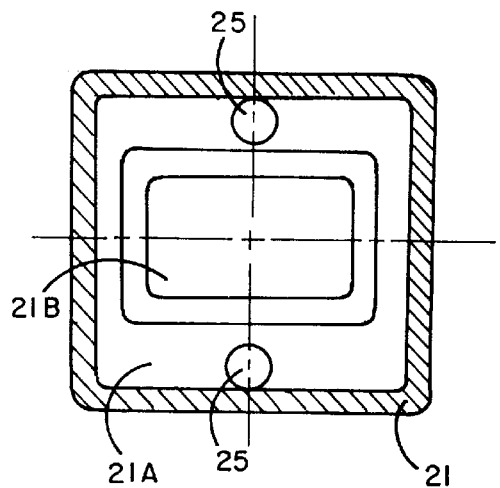
FIG. 5 Is a cross-sectional view along line CC—CC of FIG. 4
Figure 6:
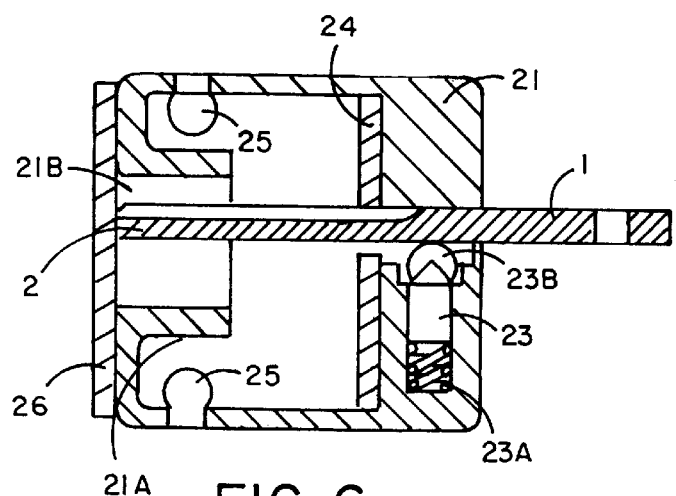
FIG. 6 Is a cross-sectional cut along line AA AA of FIG. 3 having an inserted shank blank FIG. 7 Shadow Image (SI) of a key I on the screen.
Figure 7:
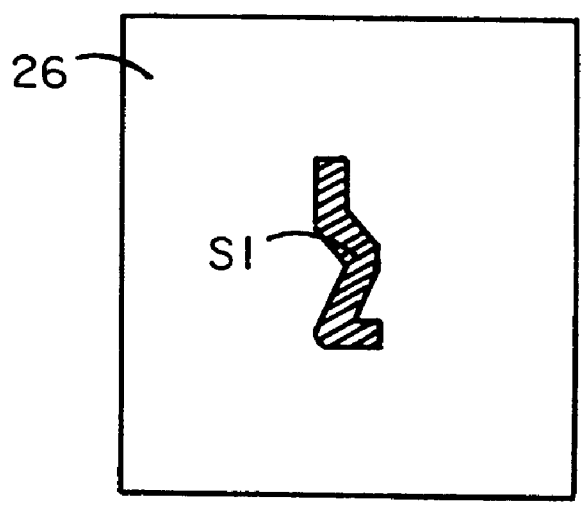

A standard key I as shown in FIGS. 2A and 2B has a head 3 and a shank 4. Along the sides of the shank 4 are the groves and indentations 5 as seen in FIG. 2B. The grooves and indentations are unique to individual manufacturers The shadow of these grooves and indentations of the original key will be imaged by a method according to this invention, in order to aid in key blank identification for the purpose of key duplication. The vertical notches 6 along the top 7 of the shank 4 and at times along the bottom 8 of the shank 4, transform the a key blank (having only groves and indentations identifying a particular manufacturer), into a key 1 shown in FIG. 2A, uniquely notched for a particular lock. It is the unique system of rear of the key shank to tip of the key shank light projection (back light) that this invention provides that will allow for precise projection of the shadow of the groves and indentations 5. Referring more particularly to the drawings in, detail, there is shown in FIG. 1 an automatic key identification system comprised of a Shadow Image Acquisition Device 20, a scanner 30, and a computer 40. The shank 4 of a key 1 as shown in FIG. 2A to be duplicated is inserted into the Shadow Image Acquisition Device 20. The Shadow Image Acquisition Device 20 provides rear of the key shank to tip 2 of the key shank 4 (back light) illumination along the groves and indentations 5 located on shank 4 there by projecting and forming a shadow image SI of the cross-section of the key shank 4 on the screen 26 FIG. 4. The scanner 30 converts the shadow image SI into digital signals. The digital signals are passed to the computer 40 which stores the digital signals into its memory, processes the digital signals and compares it to stored digital images of known keys. When a match is made between the image and the stored image, the user is told via an output subsystem (not shown) of the proper key blank to be used in duplicating the key. The purpose of the Shadow Image Acquisition Device 20 is to obtain a precise shadow image SI of the cross-section of the key. The Shadow Image Acquisition Device 20 is most clearly shown in FIGS. 3, 4, 5 and 6. Shadow Image Acquisition Device 20 is comprised of Housing 21, Insertion aperture 22, Fixating device 23, Light dissipating member 24, light emitting devices 25 and screen 26. Housing 21 of the Shadow Image Acquisition Device 20 embodies insertion aperture 22 at its forward aspect. This is most clearly seen on FIG. 4, within the insertion aperture 22 is the fixating device 23 comprised of reciprocating member 23 A and the stabilizing wheel 23 B is juxtaposed to one of the insertion apertures flat surfaces most clearly shown in FIG. 5. Directly following the fixating device 23 towards the posterior aspect of the housing 21 and affixed to the inner aspect of the frontal portion of the housing 21 is the light dissipating member 24 which circumflexes the posterior aspect of the insertion aperture 22 clearly seen on FIG. 5. The light dissipating member 24 blocks the light from entering the aperture 22, preventing the shadow of the head of the key from appearing on screen 26 and overshadowing the cross section of the key shank. Additionally, the light dissipating member 24 dissipates/disperses/scatters the light from the light emitting device 25 towards a portion of the grooves and indentations 5, illuminating the portion of the grooves and indentations while minimizing unwanted glare found in the prior art. Located at the posterior, inner aspect of the housing 21 are the Light emitting devices 25. Light emitting devices are located within the housing flexure 21A (FIGS. 5, 6 & 7) which directs the light rays on to the light dissipating member 24 and prevents the penetration of direct light rays on to the screen 26. Housing flexure 21A forms a posterior opening 21B (FIGS. 5, 6 & 7) which leads to the screen 116 at the posterior most aspect of the Shadow Image Acquisition Device 20. Screen 26 serves as the terminal point for the key shank and the projecting surface for the acquired shadow image SI clearly shown on FIG. 7. The proposed shadow Image Acquisition Device 20 works in the following manner (refer to FIG. 6); a key shank 4 is inserted into the insertion aperture 22 and through the fixating device 23 until shank tip 2 meets the screen 26 (FIG. 6). Fixating device 23 presses the key shank 4 by means of the reciprocating member 23A and rolling action of the stabilizing wheel 23B against the juxtaposed flat surface of the insertion aperture 22 (FIG. 6) thereby ensuring that the key shank 4 and the grooves and indentations 5 will be positioned perpendicularly to screen 26. Once in place, the key shank 4 is circumflexed by the light dissipating member 24 which dissipates, disperses, scatters the light from the light emitting devices 25 along a portion of the grooves and indentations 5 of the key shank 4 . Light rays pass along the grooves and indentations 5 of the key shank 4 towards the shank tip 2 and form a shadow image SI on the screen 26 FIG. 7. The acquired shadow image, SI will be without flaws described in the prior art section of this application. Since the light rays are now traveling from the rear portion of the key shank 4 along its grooves and indentations 5 towards the shank tip 2 to form a shadow image on the screen 26, we are free of all the glare and glints present when light impinges on the key tip 2 as in the prior art. The geometric and reflective variations of key tips caused by design differences and wear and tear are subsequently eliminated. The shadow image of the key is then compared to the digital images stored in the computer memory. Having now described an embodiment of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

I claim:

1. A shadow image acquisition device comprising:
    a housing having an aperture therethrough for holding any key shank the key shank having a tip portion and a rear portion near the key head;
    a screen disposed at a first end of the aperture near the tip of an inserted key shank for capturing images of groves and indentations of the key shank; and
    means for illuminating the grooves and indentations of the key shank by illuminating the key shank from the rear portion of the shank towards the tip portion of the shank such that a shadow of the grooves and indentations appears on the screen.

2. A shadow image acquisition device as in claim 1, wherein the means for illuminating the groves and indentations of the key shank comprise at least one light source and a light dissipating/scattering/dispersing device between the light source and at least a portion of the key shank.

3. A shadow image acquisition device as in claim 2, wherein the light dissipating/scattering/dispersing device is situated such that the light dissipating/scattering/dispersing device is in close proximity with at least one portion of the groves and indentations of an inserted key shank.

4. A shadow image acquisition device as in claim 3, wherein the light dissipating/scattering/dispersing device directs light from the light source onto the at least one portion of the groves and indentations of the inserted key shank, resulting in the shadow of the cross section of the key shank on the screen, without causing glints and glares.

5. A shadow image acquisition device as in claim 2, wherein the light dissipating/scattering/dispersing device illuminate the grooves and indentations such that light travels from at least one portion of the key shank to a tip of the key shank.

6. A shadow image acquisition device as in claim 2, wherein the housing further comprises a flexure partially surrounding the at least one light source such that the light from the at least one light source does not directly impinge the screen.

7. A shadow image acquisition device as in claim 6, wherein the flexure also extends to the light dissipating/scattering/dispersing device, such that light from the light source does not impinge directly on the key shank such that glints and glares are avoided.

8. A shadow image acquisition device as in claim 2, wherein the light dissipating/scattering/dispersing device directs light to a portion of the key shank other than the tip of the shank.

9. A shadow image acquisition device as in claim 2, wherein the light dissipating/scattering/dispersing device also blocks light from entering from a second end of the aperture near the key head, preventing the formation of a shadow of the key head on the screen.

10. A shadow image acquisition device as in claim 1, wherein the screen is perpendicular to the aperture.

11. A shadow image acquisition device as in claim 10, further having fixing means for securing any key in the aperture perpendicular to the screen.

12. A shadow image acquisition device as in claim 10, wherein the fixing means comprises a reciprocating member for engaging the key against the housing, perpendicular to the screen, and a stabilizing wheel for securing the key in position by pressing against the grooves and indentations of the key shank.

13. A shadow image acquisition device as in claim 1, wherein a portion of the key shank being illuminated by the means for illuminating is any portion other than the shank tip.

14. A method of forming a shadow of grooves and indentations of a key shank having a tip portion and a rear portion near the key head, comprising steps of:

generating light from the rear portion of the shank towards the tip portion of the shank;

illuminating the grooves and indentations of the key shank with the generated light; and projecting a shadow of the grooves and indentations of the cross section of the key shank.

15. A system of key identification having:

a shadow image acquisition device which produces a shadow of grooves and indentations of a key shank on a screen by illuminating the grooves and indentations of the key shank from a rear portion of the shank proximate to the key head towards a tip portion of the shank;

a scanner for converting the shadow image into digital signals; and a computer for storing the digital signals and comparing the digital signals to stored digital signals of images of known key blanks.

* * * * *